(12) United States Patent
Talley et al.

(10) Patent No.: US 9,788,194 B1
(45) Date of Patent: Oct. 10, 2017

(54) DYNAMICALLY ADJUSTING BASE STATION CONFIGURATION BASED ON ALTITUDE

(71) Applicant: Sprint Spectrum L.P., Overland Park, KS (US)

(72) Inventors: Ryan S. Talley, Overland Park, KS (US); Kyle Allen, Overland Park, KS (US); Shilpa Kowdley Srinivas, Brambleton, VA (US); Murali Malreddy, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 958 days.

(21) Appl. No.: 13/826,597

(22) Filed: Mar. 14, 2013

(51) Int. Cl.
*H04M 3/00* (2006.01)
*H04W 8/22* (2009.01)

(52) U.S. Cl.
CPC ..................................... *H04W 8/22* (2013.01)

(58) Field of Classification Search
CPC . H04W 72/048; H04W 24/00; H04W 52/343; H04W 52/16; H04W 52/245; H04B 17/318; H04B 7/028; H04B 7/0617; H04B 7/06; H04B 7/02
USPC ............................... 455/561, 562.1, 571, 418
See application file for complete search history.

(56) References Cited

U.S. PATENT DOCUMENTS

| | | | |
|---|---|---|---|
| 8,126,496 B2 * | 2/2012 | Brisebois et al. | 455/522 |
| 2003/0125046 A1 * | 7/2003 | Riley | G01S 5/0205 455/456.1 |
| 2012/0015684 A1 * | 1/2012 | Noji | 455/524 |
| 2012/0163238 A1 * | 6/2012 | Gunnarsson et al. | 370/254 |

* cited by examiner

*Primary Examiner* — Lester Kincaid
*Assistant Examiner* — Sayed T Zewari

(57) ABSTRACT

Presently disclosed are methods and systems to dynamically adjust base station configurations based on the altitude of the base station. One embodiment takes the form of a method carried out by a cellular base station system. The method includes determining that an altitude of a cellular base station exceeds a threshold. The method also includes configuring the cellular base station with one or more operational parameters based on the determined altitude. The one or more operational parameters includes at least one parameter selected from the group consisting of a transmit power, a carrier frequency, a handoff parameter, and a whitelist.

20 Claims, 5 Drawing Sheets

DYNAMICALLY ADJUSTING BASE STATION CONFIGURATION BASED ON ALTITUDE

BACKGROUND

Unless otherwise indicated herein, the materials described in this section are not prior art to the claims and are not admitted to be prior art by inclusion in this section.

In a typical cellular wireless communication system, an area is divided into cells and cell sectors, each defined by a radio frequency radiation pattern from a respective base station. Each base station is then typically connected with other network infrastructure.

A typical cellular wireless system includes a number of base stations that radiate to define wireless coverage areas, such as cells and cell sectors, in which wireless communication devices (WCDs), such as cell phones, tablet computers, tracking devices, embedded wireless modules, and other wirelessly equipped communication devices, can operate. In turn, each base station is typically coupled with equipment that provides connectivity with one or more transport networks, such as the public switched telephone network (PSTN) and/or the Internet for instance. With this arrangement, a WCD operating within a coverage area of any base station can engage in air interface communication with the base station and can thereby communicate via the base station with various remote network entities or with other WCDs served by the base station.

WCDs and base stations generally communicate with each other over a radio frequency (RF) air interface according to a defined air interface protocol, examples of which include CDMA (e.g., IS-95, IS-2000, 1xRTT, 1xEV-DO, etc.), LTE, WiMAX, iDEN, TDMA, AMPS, GSM, GPRS, UMTS, EDGE, WI-FI (e.g., 802.11), BLUETOOTH, and others now known or later developed. Such air interface communication typically occurs on a frequency known as a "carrier" (which may actually be a pair of frequencies, one for communications from the base station to the WCD, and another for communication from the WCD to the base station). The base-station-to-WCD link is known as the "forward link," while the WCD-to-base-station link is known as the "reverse link."

A wireless service provider typically operates numerous base stations in a given geographic region, to provide robust air interface coverage as WCDs move from one location to another. These cellular base stations are usually not associated with any subscriber or small group of subscribers in particular; rather, they are usually placed in publicly-accessible locations designed so that their coverage blankets cities, rural areas, etc. to be used by the service provider's customers generally. As such, these types of base stations are generally known as "macro base stations," and the network that they collectively form, or to which they belong, is generally known as a "macro network."

To address gaps in macro-network coverage (e.g. poor in-building coverage) and for other reasons, macro-network providers may offer their subscribers private base station devices known as "femtocells," (also sometimes referred to as picocells, ubicells, microcells, or as femto-, pico-, ubi-, or micro-base stations or base transceiver stations), which are essentially small, low-power, low-capacity, and low-cost versions of a macro base station. As a general matter, a femtocell, which may be approximately the size of a desktop phone or WiFi access point, may communicate (through a wired or wireless link) with the user's broadband router and may establish a virtual private network (VPN) connection via the Internet with the wireless service provider's core network (e.g., with a femtocell controller on the wireless service provider's network). Further, the femtocell may include a wireless communication interface that is compatible with the user's WCDs and that is arranged to serve the WCD in much the same way that a macro base station does. With a femtocell positioned in a location where macro network coverage may be poor or unavailable, a user's WCD can thus be served by the femtocell in much the same way that the WCD would be served by a macro base station when within coverage of the macro network.

OVERVIEW

Base stations may be installed at high altitudes to address gaps in macro-network coverage, as well as for other reasons. However, as the altitude of such base stations increases, interference and handoff problems may also increase as signals transmitted from high-altitude base stations may cover a broader area. In one example, a WCD at ground level that is served by a low-altitude base station may receive forward link transmissions from a high-altitude base station, and those forward link transmissions from the high-altitude base station may (i) interfere with forward link transmissions the WCD receives from the low-altitude base station and (ii) possibly cause the WCD to request handoff to the high-altitude base station, even though the high-altitude base station is distant from the WCD. In another example, a WCD served by a high-altitude base station may receive forward link transmissions from a low-altitude base station, and those forward link transmissions from the low-altitude base station may (i) interfere with forward link transmissions the WCD receives from the high-altitude base station and (ii) possibly cause the WCD to request handoff to the low-altitude base station, even though the low-altitude base station is distant from the WCD. Other examples are possible as well.

Disclosed herein is a method and corresponding system to help address these or other issues, by automatically adjusting one or more operational parameters of a base station based on the base station's altitude. In particular, the method may involve determining the base station's altitude, determining that the altitude exceeds a threshold, and responsively configuring the base station with one or more operational parameters based on the determined altitude.

By way of example, the method may involve determining that the base station is at a threshold high altitude and responsively decreasing the base station transmit power to help avoid having WCDs at lower altitude seek handoff to the high-altitude base station, and to help minimize forward link interference to those WCDs. As another example, the method may involve determining that the base station is at a threshold high altitude and responsively increasing the base station transmit power to help overcome forward link interference to WCDs served by the high-altitude base station. As another example, the method may involve determining that the base station is at a threshold high altitude and responsively selecting a carrier frequency on which to operate, such as one different than those used at lower altitudes. As yet another example, the method may involve determining that the base station is at a threshold high altitude and responsively defining and activating a whitelist for the high-altitude base station, so as to help prevent unauthorized WCDs from being served by the high-altitude base station. And as yet another example, the method may involve adjusting one or more handoff parameters of the base station when the altitude of the base station exceeds the threshold altitude. The one or more adjusted handoff parameters may help avoid having WCDs at lower altitude seek handoff to the high-altitude base station, and may help avoid having WCDs at higher altitude seek handoff to a low-altitude base station.

One embodiment takes the form of a method carried out by a cellular base station system. The method includes determining that the altitude of a cellular base station exceeds a threshold. Responsive to determining that the altitude of the cellular base station exceeds the threshold, the method then includes configuring the cellular base station with one or more operational parameters based on the determined altitude. By way of example, the one or more operational parameters could include a transmit power, a carrier frequency, a handoff parameter, a whitelist, and/or another parameter defining operation of the base station and/or of WCDs in the environment of the base station.

Another embodiment provides a computing device. The device includes a processor and data storage. Further, the device includes program logic stored in the data storage and executable by the processor to cause the computing device to carry out functions including those of the just-described method. Yet another embodiment provides a non-transitory computer-readable medium having stored thereon program instructions executable by a processing unit to cause a computing device to carry out functions including those of the just-described method.

These and other aspects and advantages will become apparent to those of ordinary skill in the art by reading the following detailed description, with reference where appropriate to the accompanying drawings. Further, it should be understood that this overview and other description throughout this document is provided merely for purposes of example and is not intended to limit the scope of the invention as claimed.

DETAILED DESCRIPTION

The present method and corresponding device will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

I. EXAMPLE SCENARIO

Figure 1:
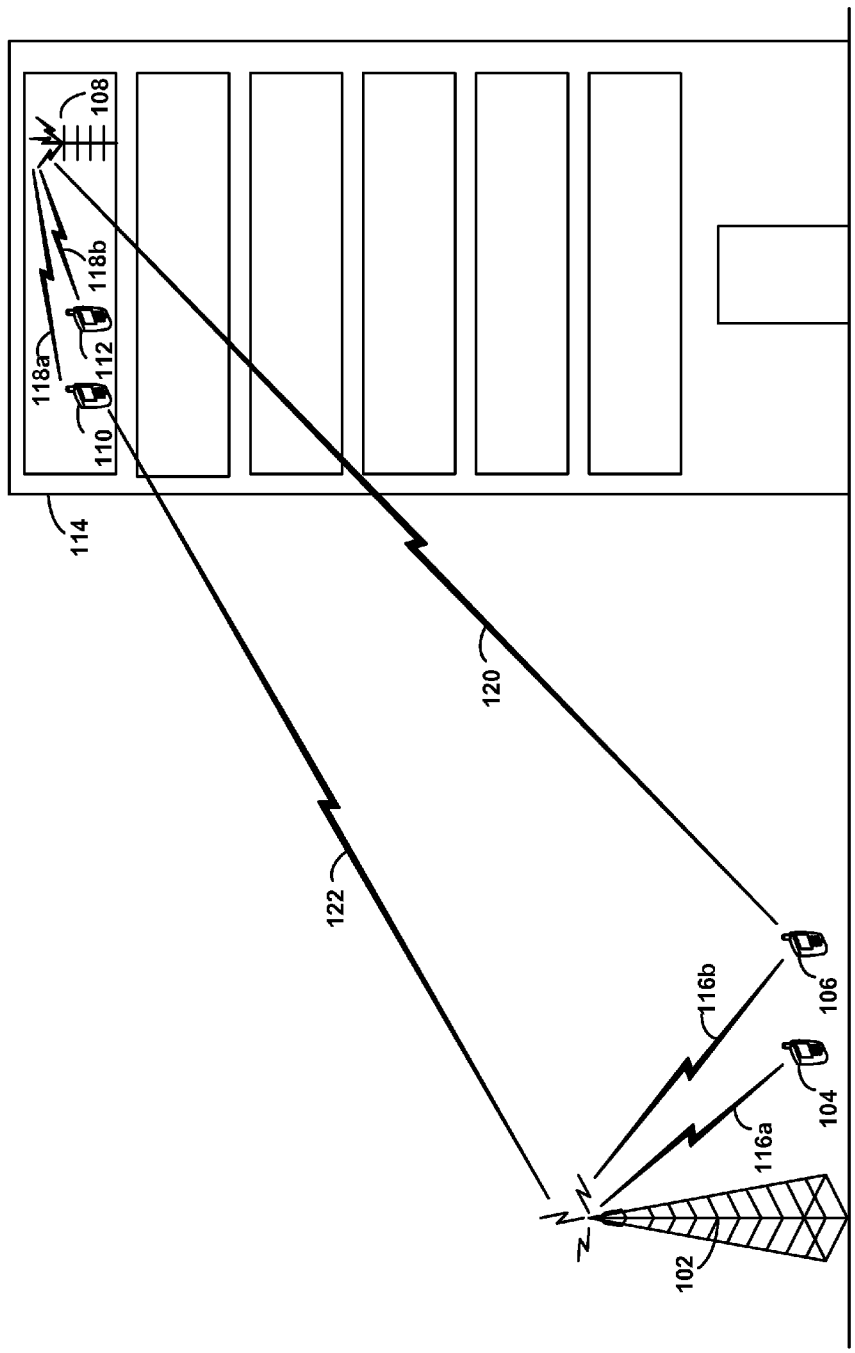
FIG. 1 illustrates example high and low altitude base stations in accordance with at least one embodiment.

FIG. 1 depicts an example scenario in which the present method can apply. In particular, FIG. 1 depicts a low-altitude base station 102 serving WCDs 104, 106 and a high-altitude base station 108 serving WCDs 110, 112. In one example, low-altitude base station 102 may be a macro base station. High-altitude base station 108 is shown in a high rise building 114, by way of example. In one example, high altitude base station 108 may be a femtocell.

WCDs 104, 106 may communicate with low-altitude base station 102 over air interfaces 116a, 116b, respectively. Transmissions over air interface 116a from low-altitude base station 102 to WCD 104 and over air interface 116b from low-altitude base station 102 to WCD 106 may take place on forward links to the WCDs. Conversely, transmissions over air interface 116a from WCD 104 to low-altitude base station 102 and over air interface 116b from WCD 106 to low-altitude base station 102 may take place on reverse links from the WCDs.

Similarly, WCDs 110, 112 may communicate with high-altitude base station 108 over air interfaces 118a, 118b, respectively. Transmissions between high-altitude base station 108 and WCDs 110, 112 over air interfaces 118a, 118b may take place on forward and reverse links, as described above.

High-altitude base station 108 may be installed in a high rise building 114 to address gaps in macro network coverage, as well as for other reasons. However, such high-altitude base stations may experience interference and handoff problems as signals transmitted from high-altitude base stations may cover a broader area.

In one example, ground-level WCD 106, which is served by low-altitude base station 102, may receive forward link transmissions over air interface 120 from high-altitude base station 108. The forward link transmission from high-altitude base station 108 may interfere with the forward link transmission WCD 106 receives from low-altitude base station 102 over air interface 116b. Additionally, the forward link transmission from high-altitude base station 108 may cause WCD 106 to request handoff to high-altitude base station 108, even though high-altitude base station 108 is distant from WCD 106.

In another example, high-altitude WCD 110, which is served by high-altitude base station 108, may receive forward link transmissions over air interface 122 from low-altitude base station 102. The forward link transmission from low-altitude base station 102 may interfere with the forward link transmission WCD 110 receives from high-altitude base station 108 over air interface 118a. Additionally, the forward link transmission from low-altitude base station 102 may cause WCD 110 to request handoff to low-altitude base station 102, even though low-altitude base station 102 is distant from WCD 110. Other examples are possible as well.

As noted above, disclosed herein is a method and corresponding system to help address these or other issues, by automatically adjusting one or more parameters of a base station based on the base station's altitude. In particular, the method may involve determining the base station's altitude, determining that the altitude exceeds a threshold, and responsively configuring the base station with one or more operational parameters based on the determined altitude.

In line with the discussion above, in one example, the method may involve determining that the base station is at a threshold high altitude and responsively decreasing the base station transmit power to avoid having low-altitude WCD 106 seek handoff to a high-altitude base station 108, and to minimize forward link interference over air interface 120. As another example, the method may involve determining that the base station is at a threshold high altitude and responsively increasing the base station transmit power to help overcome forward link interference over air interface 122 to WCD 110 served by high-altitude base station 108. As another example, the method may involve determining that the base station is at a threshold high altitude and responsively selecting a carrier frequency on which to operate, for example one different than those used at lower altitudes. As yet another example, the method may involve determining that the base station is at a threshold high altitude and responsively defining and activating a whitelist for high-altitude base station 108, so as to help prevent unauthorized WCDs, for example WCD 106, from being served by the high-altitude base station 108. And as yet another example, the method may involve adjusting one or more handoff parameters of the base station when the altitude of the base station exceeds the threshold altitude. The one or more adjusted handoff parameters may help avoid having low-altitude WCD 106 seek handoff to high-altitude base station 108, and may help avoid having high-altitude WCD 110 seek handoff to low-altitude base station 102. Other examples are possible as well.

II. EXAMPLE ARCHITECTURE a. Example Wireless Communication Network

Figure 2:
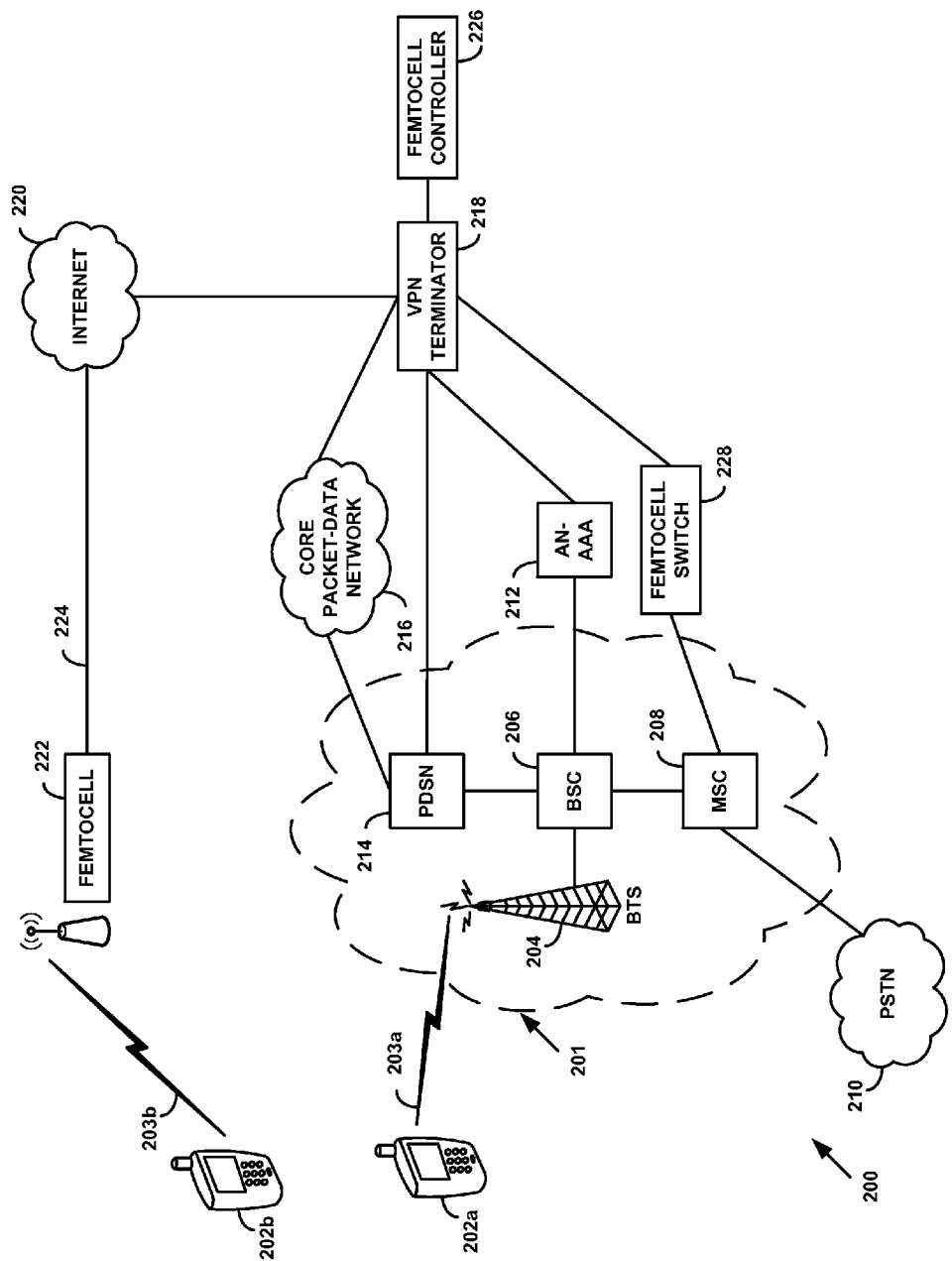
FIG. 2 is a simplified block diagram of an example wireless communication network in which at least one embodiment can be carried out.

FIG. 2 is a simplified block diagram of a wireless communication network 200 including macro-cellular radio access network (RAN) 201, in which an exemplary embodiment can be deployed. Generally, communication network 200 may operate according to various technologies including, but not limited to, Code-Division Multiple Access (CDMA), Universal Mobile Telecommunications System (UMTS®), Orthogonal Frequency Division Multiple Access (OFDMA) (e.g., Long Term Evolution (LTE®) or Worldwide Interoperability for Microwave Access (WIMAX®)), IDEN®, or 802.11 (Wifi).

As shown in FIG. 2, WCD 202*a* may communicate with base transceiver station (BTS) 204 (which may also be referred to as a "macro base station") over air interface 203*a*. Further, second WCD 202*b* may communicate with a second base station, for example, a femtocell device 222 (which may also be referred to simply as a "femtocell") over air interface 203*b*. Communication on each air interface may occur on a particular carrier frequency. In one example, the carrier frequency used by femtocell device 222 to communicate with WCD 202*b* is different than the carrier frequency used by BTS 204 to communicate with WCD 202*a*.

BTS 204 may be coupled to or integrated with base station controller (BSC) 206. BSC 206 may serve to control assignment of carrier frequencies (e.g., over air interface 203*a*). BSC 206 may also be connected to mobile switching center (MSC) 208, which in turn may provide access to wireless circuit-switched services such as circuit-voice and circuit-data (e.g., modem-based packet data) service.

As represented by its connection to public-switched telephone network (PSTN) 110, MSC 208 may also be coupled with one or more other MSCs, other telephony circuit switches in the wireless service operator's (or in a different operator's) network, or other wireless communication systems. In this way, wireless communication network 200 may support user mobility across MSC regions, roaming between systems, and local and long-distance landline telephone services. Of course, part or all of MSC 208 may be replaced by softswitch components (not shown) that transport voice and other media over packet-switched networks.

BSC 206 may also be connected to access network authentication, authorization, and accounting (AN-AAA) server 212. AN-AAA server 212 may support link-level authentication and authorization for WCD data sessions. Data transport may be provided by way of a communicative link between BSC 206 and packet-data serving node (PDSN) 214, which in turn provides connectivity with the wireless service provider's core packet-data network 216.

PDSN 214 may be a router-like device that manages the connectivity of WCDs to a packet-switched network, such as the core packet-data network 216, the Internet 220, or one or more private IP networks (not shown). In an example embodiment, PDSN 214 may serve tens, hundreds or thousands of WCDs via point to point protocol (PPP) links to each of these WCDs.

Core packet-data network 216 could comprise one or more additional switches, routers, and gateways (not shown) that collectively provide transport and interconnection among the various entities and networks of macro-cellular RAN 201. In this context, for instance, core packet-data network 216 could be an overlay on or a sub-network of one or more additional networks.

Continuing with the description of FIG. 2, wireless communication network 200 may also include a virtual private network (VPN) terminator 218. VPN terminator 218 may serve as an endpoint for secure connections with authorized devices seeking access to macro-cellular RAN 201 via unsecure, external networks such as the Internet 220. For instance, femtocell device 222 may connect to Internet 220 over a broadband connection 224 (e.g., a cable modem, digital subscriber line (DSL), or T-carrier connection) and then to VPN terminator 218. (Broadband connection 224 may be classified as a type of backhaul connection.) Femtocell device 222 could include a VPN client component that establishes a secure tunnel with VPN terminator 218, such that packet-data communications over the secure tunnel between femtocell device 222 and VPN terminator 218 can then take place securely. Secure tunnels can be implemented according to such protocols as IP Security (IPsec), although other mechanisms may be employed.

Assuming a secure VPN connection is established between femtocell device 222 and VPN terminator 218, femtocell device 222 may then communicate securely with other entities in macro-cellular RAN 201 by way of the VPN terminator 218. In particular, femtocell device 222 may receive configuration and messaging data and other operational parameters from femtocell controller 226. Femtocell controller 226 may also provide similar control and services for other femtocell devices connected to network macro-cellular RAN 201. Femtocell switch 228 may act as a signaling gateway between MSC 208 and VPN terminator 218, enabling access terminals communicating via femtocell device, such as WCD 202*b* via femtocell device 222, to engage in calls via MSC 208 to other wireless devices, as well as over PSTN 210.

It should be understood that the terms "base station system" and "cellular base station system" can be used interchangeably to refer to a base station, or a combination of a base station and base station controller. Accordingly, references to a "base station system" or "cellular base station system" herein may apply to, but are not limited to a femtocell, a macro base station such as a BTS, a BSC, a femtocell controller, a combination BTS and BSC, or a combination of a femtocell and a femtocell controller.

It should also be understood that the depiction of just one of each network component in FIG. 2 is illustrative, and there could be more than one of any component. Communication network 200 may also contain other types of components not shown. Alternatively or additionally, any network component in FIG. 2 could be omitted, or combined with another network component, without departing from the scope of the invention. Thus, the particular arrangement shown in FIG. 2 should not be viewed as limiting with respect to the present invention.

b. Example Wireless Communication Device

Figure 3:
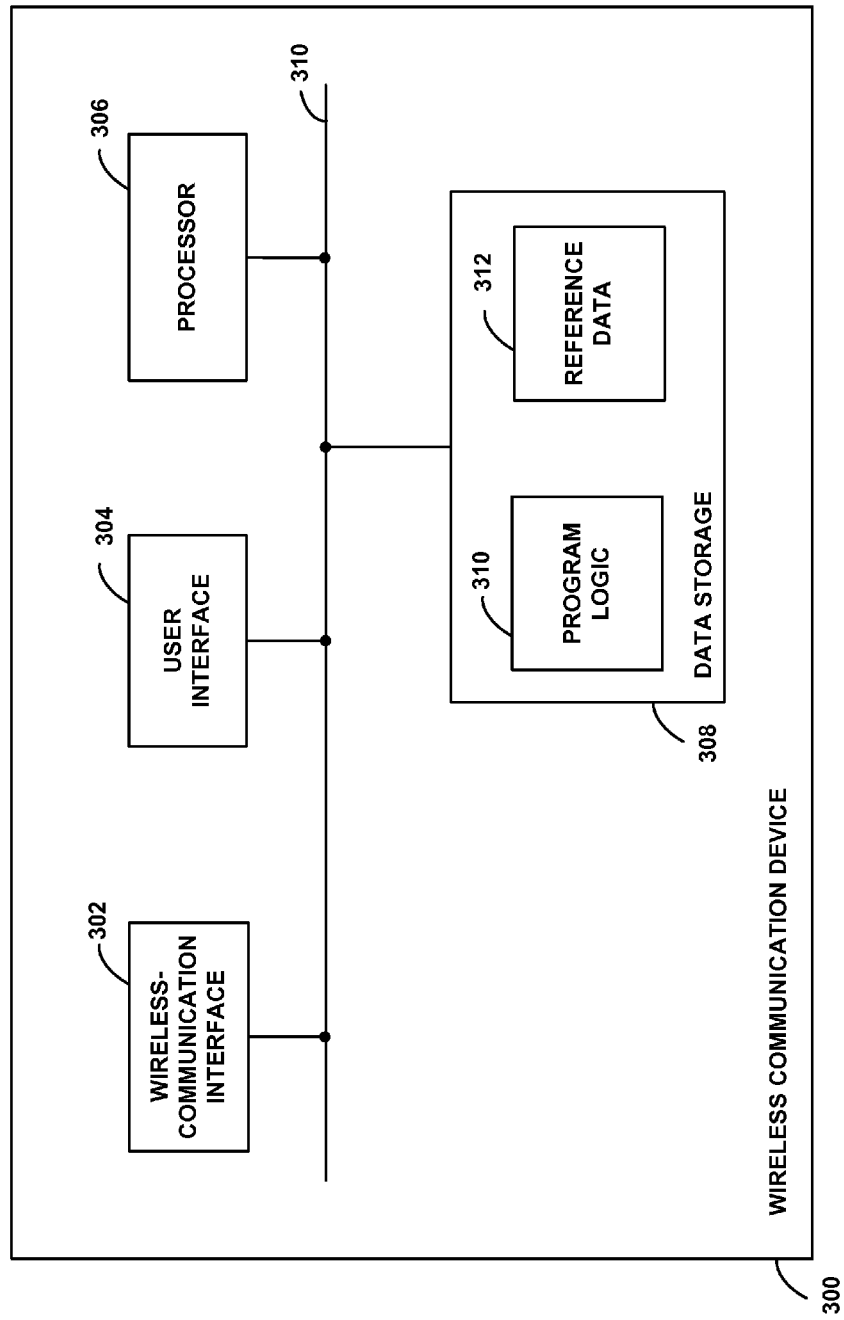
FIG. 3 is a simplified block diagram of an example wireless communication device (WCD) in accordance with at least one embodiment.

Those skilled in the art will appreciate that there can be numerous specific implementations of a WCD that may be used in connection with at least one embodiment of the method described herein. By way of example, FIG. 3 is a simplified block diagram of a WCD 300, showing functional components that can be included in such a device to facilitate implementation of at least one embodiment.

As shown, the example device includes a wireless-communication interface 302, a user interface 304, a processor 306, and data storage 308, all of which may be coupled together by a system bus, network, or other connection mechanism 310.

Wireless-communication interface 302 may be or include any combination of software and/or hardware modules that WCD 300 uses to communicate in a wireless manner with one or more other entities. As such, wireless-communication interface 302 may have one or more chipsets suitable for wireless communication, and/or one or more other components suitable for engaging in data communication. For instance, wireless-communication interface 302 may operate in compliance with one of the air-interface protocols noted above.

User interface 304 may include one or more input and/or output components to facilitate interaction with a user of the device. As such, the user interface may include input components such as a keypad, touchpad, touch-sensitive display, microphone, and camera, and the user interface may further include output components such as a display screen and a sound speaker or headset jack. Other input and output components are possible as well.

Processor 306 may include one or more general purpose processors (e.g., INTEL microprocessors) and/or one or more special purpose processors (e.g., digital signal processors, application specific integrated circuits, etc.) and may be integrated in whole or in part with wireless-communication interface 302 and/or other components of the WCD.

Data storage 308 may include one or more volatile and/or non-volatile storage components, such as optical, magnetic, flash, or organic storage components, and may be integrated in whole or in part with the processor 306. Data storage 308 may include any type of non-transitory computer-readable medium or media, such as a storage device that includes a disk and/or a hard drive, as examples. The computer-readable medium may include media arranged to store data for short periods of time, such as register memory, processor cache, and/or random access memory (RAM), as examples. The computer-readable medium may also or instead include media arranged to serve as secondary or more persistent long-term storage, such as read only memory (ROM), optical disks, magnetic disks, and/or compact-disc ROM (CD-ROM), as examples. The computer-readable media may also or instead include any other volatile and/or non-volatile storage system or systems deemed suitable for a given implementation.

As shown, representative data storage 308 includes program logic 310 and reference data 312. Program logic 310 may include instructions executable by processor 306 to carry out various WCD functions described herein. The non-transitory data storage 308 may also hold reference data 312 for use in accordance with the present method, such as one or more stored identifiers of WCD 300 (e.g., a mobile identification number or electronic serial number).

These various elements may be integrated together, distributed, or modified in various ways, and the WCD may have more or fewer elements than these.

c. Example Cellular Base Station

Figure 4:
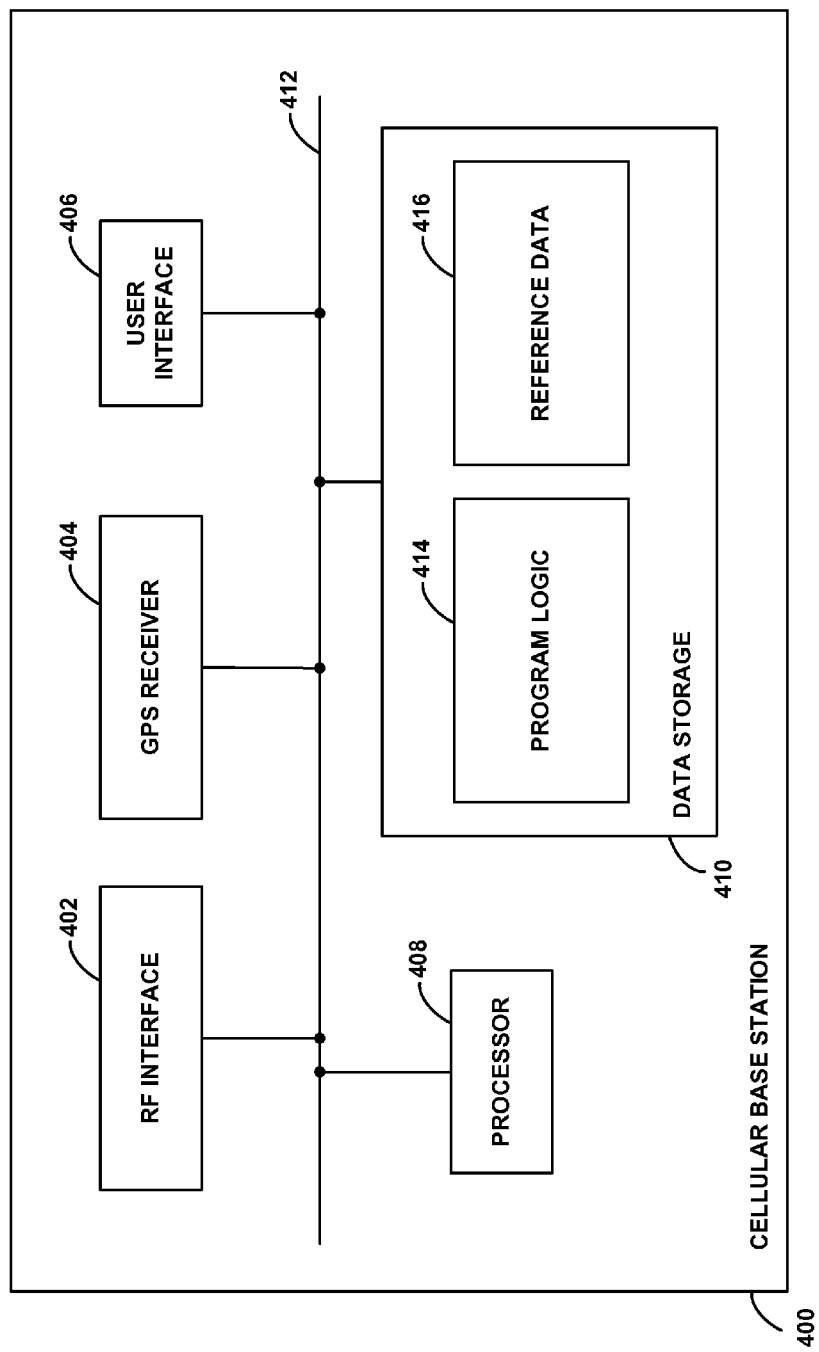
FIG. 4 is a simplified block diagram of a cellular base station in accordance with at least one embodiment.

Those skilled in the art will appreciate that there can be numerous specific implementations of a base station that may be used in connection with at least one embodiment of the method described herein. By way of example, FIG. 4 is a simplified block diagram of a base station 400, showing functional components that can be included in such a device to facilitate implementation of at least one embodiment.

As shown, the example base station includes a an RF interface 402, a GPS receiver 404, a user interface 406, a processor 408, and data storage 410, all communicatively linked by a system bus 412.

RF interface 402 may include one or more antennas, one or more chipsets, a set of one or more channel elements, and/or one or more other components suitable for providing a wireless coverage area according to a wireless-communication protocol, such those discussed above. GPS receiver 404 may be any known or hereafter-developed GPS receiver, suitable for receiving and decoding GPS signals for location and timing purposes, perhaps among other purposes. In some embodiments, a base station may have a location module in addition to or instead of a GPS receiver.

User interface 406 may include one or more elements for receiving inputs, as well as a one or more elements for communicating outputs. Processor 408 may comprise multiple (e.g., parallel) processors, such as a general purpose microprocessor and/or a discrete digital signal processor. The data storage 410 may take various forms, in one or more parts, such as a non-volatile storage block and/or a removable storage medium, and may include program logic 414 executable by processor 408 for carrying out the functions described herein. Data storage 410 may also include reference data 416, which may store and maintain, for example, one or more whitelists for determining WCDs authorized to use base station 400.

III. EXAMPLE OPERATION

Figure 5:
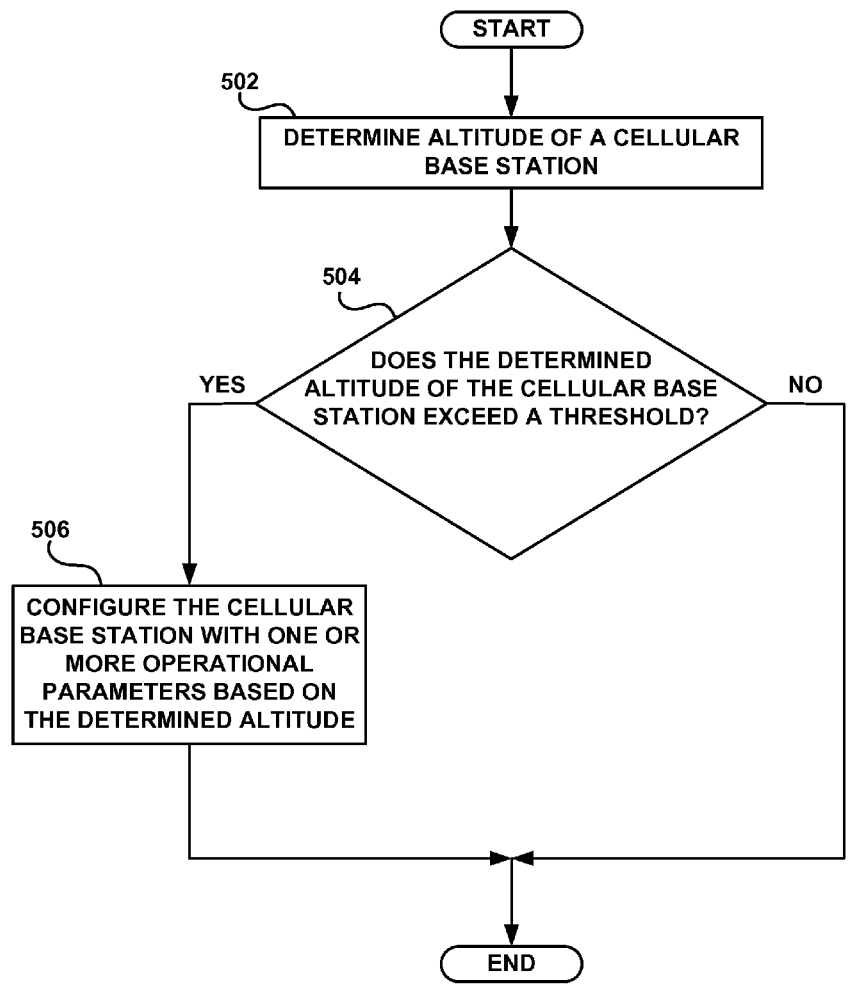
FIG. 5 is a flowchart depicting functions that can be carried out in accordance with at least one embodiment.

FIG. 5 is a flowchart depicting functions that may be carried out in accordance with at least one embodiment. In particular, FIG. 5 illustrates a method that may be carried out by a cellular base station system.

Although the blocks are shown in a sequential order, the functions represented by these blocks could instead be carried out in parallel and/or in a different order than that described herein, unless context clearly dictates otherwise, such as clearly indicating a sequential dependency, as one example. Also, the various blocks may be combined into fewer blocks, divided into additional blocks, and/or removed based upon the specifics of a given implementation.

As shown in FIG. 5, at block 502, the method begins with determining the altitude of a base station. In at least one embodiment, determining the altitude of the base station may involve receiving an indication of the altitude from one or more components of the base station. For example, the base station may include a GPS receiver 404 and the base station may be able to obtain its altitude via the GPS receiver 404. In another embodiment, the base station may be equipped with an accelerometer, a gyroscope, and/or an altimeter, and the base station may be able to obtain or infer its altitude from measurements performed by one or more of these components.

In yet another embodiment, a network address or other such characteristic of the base station may be used to determine the altitude of the base station. In one embodiment, for instance, the base station system may store network address information in the data storage 410 of the base station. Once the network address is determined, the base station system may then query predefined correlation data that correlates network addresses with altitude, and thereby determine the altitude of the base station having the determined network address. For example, the base station may include a user interface to input floor information associated with the network address, and the base station may store such information in its data storage 410. The base station system may then use the floor information to determine an altitude of the base station. Other embodiments are possible as well.

At block 504, the method next involves comparing the determined altitude of the base station to a threshold altitude to determine whether the altitude of the base station exceeds the threshold. The base station may store the threshold altitude in its data storage 410, or the base station controller may store the threshold altitude. The base station system may then compare the determined altitude of the base station with the stored threshold altitude to determine whether the altitude of the base station exceeds the threshold. In another embodiment of the present method, the base station may store multiple thresholds in its data storage 410. In such an embodiment, the base station system may compare the determined altitude of the base station to each of the stored threshold altitudes.

In at least one embodiment, a user interface of the base station may be used to configure the threshold altitude required to dynamically adjust the base station configuration. In another embodiment, the threshold altitude is programmed into the hardware of the base station, and the user may not be able to change the threshold altitude.

If the altitude of the base station exceeds the threshold altitude, the method continues at block 506 with configuring the base station with one or more operational parameters based on the determined altitude. The operational parameters of the base station that may be configured include transmit power, carrier frequency, handoff parameters and/or whitelist authorization. The base station or base station controller may store program logic in its data storage defining one or more threshold altitudes and one or more base station configurations corresponding to the one or more threshold altitudes.

TABLE 1

| Threshold Altitude | Operational Parameter |
|---|---|
| A | Operational Parameters A |
| B | Operational Parameters B |
| C | Operational Parameters C |

Table 1 illustrates an example scenario with three threshold altitudes (A, B, and C). If a base station exceeds altitude A, but is less than altitude B, the program logic may cause the base station system to configure the base station with operational parameters A. If the base station exceeds altitude B, but is less than altitude C, the program logic may cause the base station system to configure the base station with operation parameters B. If the base station exceeds altitude C, the program logic may cause the base station system to configure the base station with operational parameters C. Such a table may be stored in the data storage 410 of the base station or may be stored in the base station controller. Operational parameters A may be different from operational parameters B which may be different from operational parameters C.

In one embodiment of the present method, program logic may cause the base station system to decrease the base station transmit power when the altitude of the base station exceeds a threshold altitude. Decreasing the high-altitude base station transmit power may help prevent WCDs at lower altitude from seeking handoff to the high-altitude base station. Further, decreasing the high-altitude base station transmit power may help minimize forward link interference to low altitude WCDs. In another example, program logic may cause the base station system to increase the base station transmit power when the altitude of the base station exceeds a threshold altitude. Increasing the high-altitude base station transmit power may help overcome forward link interference to WCDs served by the high-altitude base station.

In another embodiment of the present method, program logic may cause the base station system to select a distinct carrier frequency on which to operate when the altitude of the base station exceeds a threshold altitude. In one example, the program logic may cause the RF interface 402 of the base station to dynamically adjust the carrier frequency when the altitude of the base station exceeds a threshold altitude. The carrier frequency used by a base station above the threshold altitude may be different than those used by base stations below the threshold altitude. Selecting a distinct carrier frequency at high altitude my help minimize forward link interference to low altitude WCDs. Other embodiments are possible as well.

In yet another embodiment of the present method, program logic may cause the base station system to activate a whitelist for the base station when the base station exceeds a threshold altitude. In one example, when the altitude of the base station exceeds the threshold altitude, the base station system may automatically activate a whitelist to allow only certain predefined WCDs to access the high-altitude base station. The base station may include a user interface 406 through which a user may define a whitelist during initial setup of the base station, or at any other time. Activating a whitelist may help prevent unauthorized WCDs from being served by the high-altitude base station, thereby reducing base station traffic and potentially increasing base station performance.

In order to authenticate a WCD requesting to be served by the high-altitude base station, the high-altitude base station may access a whitelist of authorized WCDs to determine whether an identifier of the WCD is listed in the whitelist. An identifier may be, for example, a mobile identification number (MIN) or an electronic serial number (ESN) associated with the WCD. Other identifiers could also be used as well. Identifiers may be globally unique among all WCDs, locally unique among a small group of WCDs, or may be shared among a large group of related WCDs. Other embodiments are possible as well. If an identifier of a WCD is listed in the whitelist, the WCD is authorized to be served by the high-altitude base station. Such a whitelist may be stored local to the high-altitude base station or remotely from the high-altitude base station.

If stored local to the high-altitude base station, the whitelist may be stored in a local volatile or non-volatile memory of the base station, including for example, the reference data element 416. In such an embodiment, a registered user may populate the whitelist with identifiers associated with WCDs that are authorized to use the base station. In the event that the whitelist is stored remote from the high-altitude base station, the whitelist may be populated by a wireless service provider, or perhaps the wireless service may provide an interface to allow a registered user of the high-altitude base station to access and populate the remote whitelist. Alternatively, the high-altitude base station may retrieve the remotely-stored whitelist via a file transfer connection. Other possibilities exist as well.

In yet another embodiment of the present method, program logic may cause the base station system to adjust one or more handoff parameters of the base station the altitude of the base station exceeds a threshold altitude. The one or more adjusted handoff parameters may help avoid having WCDs at lower altitude seek handoff to a high-altitude base station, and may help avoid having WCDs at higher altitude seek handoff to a low-altitude base station.

To enable a WCD to select an appropriate coverage area in which to operate, base stations in a wireless communication network may be arranged to broadcast in each of their coverage areas a respective pilot signal. A base station may provide a WCD with a handoff search window to search for such pilot signals. A handoff search window is the amount of time, in terms of chips, that a WCD will search for a pilot (one chip is approximately 0.8 µs in duration). When a WCD is initially connected to a base station, the base station may transmit a handoff search window of a particular size to the WCD. In one embodiment, when the altitude of the base station exceeds the threshold altitude, program logic may cause the base station system to dynamically adjust the size of the handoff search window. For example, the base station system may increase the handoff search window to more readily allow a high-altitude WCD to handoff to a macro base station. In another example, the base station may decrease the handoff search window to help avoid having WCDs at higher altitude seek handoff to a low-altitude base station. Other embodiments are possible as well.

In another embodiment, program logic may cause the base station system to set one or more thresholds that may be used as a condition for making a handoff decision when the altitude of the base station exceeds a threshold altitude. In one example, the handoff decision may include permitting a WCD at higher altitude to handoff to a low-altitude base station, or permitting a WCD at lower altitude to handoff to a high-altitude base station. In yet another example, the handoff decision may include preventing a WCD at lower altitude to handoff to a high-altitude base station, or preventing a WCD at higher altitude to handoff to a low-altitude base station. Other embodiments are possible as well.

In one example, a signal strength threshold may be used as a condition for making a handoff decision when the altitude of the base station exceeds a threshold altitude. The base station may store the signal strength threshold in its data storage 410, or the base station controller may store the signal strength threshold. The base station system may determine the strength of signals received by the base station from a WCD. The base station system may then compare the determined signal strength with the stored signal strength threshold to determine whether the determined signal strength exceeds the threshold. For instance, the signal strength threshold may be −10 dB. Thus, as an example, the base station system may make a handoff decision if the base station receives signals from a WCD at −10 dB or more. Other signal strength thresholds could be used as well.

In another example, a data rate threshold may be used as a condition for making a handoff decision when the altitude of the base station exceeds a threshold altitude. The base station may store the data rate threshold in its data storage 410, or the base station controller may store the data rate threshold. The base station system may determine the rate data is transferred between the base station and a WCD. The base station system may then compare the determined data rate with the stored data rate threshold to determine whether the determined data rate exceeds the threshold. For instance, the data rate threshold may be 1.0 Mbps. Thus, as an example, the base station system may make a handoff decision if a WCD receives data from the base station at 1.0 Mbps or more. Other data rate thresholds are possible as well.

In yet another example, a load threshold may be used as a condition for making a handoff decision when the altitude of the base station exceeds a threshold altitude. The base station may store the load threshold in its data storage 410, or the base station controller may store the load threshold. The base station system may determine the load of a particular region (e.g., a cell sector) by reference to the level of traffic on a paging channel associated with such a region. The base station system may then compare the determined load with the stored load threshold to determine whether the determined load exceeds the threshold. If the determined load exceeds the threshold load, the base station system may make a handoff decision.

Functions of the present method can be encoded in a set of program instructions stored on a non-transitory machine readable medium, such as magnetic, optical, or other data storage for instance, to be executed by a processor. In addition or alternatively, the functions can be specifically carried out by one or more devices or servers as discussed above.

IV. CONCLUSION

While exemplary embodiments have been described, persons of skill in the art will appreciate that variations may be made without departure from the scope and spirit of the invention. This true scope and spirit is defined by the appended claims, which may be interpreted in light of the foregoing.

We claim:

1. A method carried out by a cellular base station system, the method comprising:
   determining an altitude of the cellular base station;
   comparing the determined altitude to a threshold altitude to determine whether or not the determined altitude exceeds the threshold altitude; and
   responsive to a determination that the determined altitude exceeds the threshold altitude, configuring the cellular base station with one or more operational parameters based on the determined altitude, wherein the one or more operational parameters includes at least one parameter selected from the group consisting of a transmit power, a carrier frequency, a handoff parameter, and a whitelist.

2. The method of claim 1, wherein the cellular base station is a femtocell.

3. The method of claim 1, wherein determining the altitude of the cellular base station comprises receiving an indication of the altitude from one or more components of the cellular base station.

4. The method of claim 1, wherein determining the altitude of the cellular base station comprises:
determining a network address of the cellular base station; and
determining the altitude of the cellular base station based on the determined network address.

5. The method of claim 1, wherein configuring the cellular base station with one or more operational parameters comprises adjusting the handoff parameter, wherein the handoff parameter comprises a handoff search window.

6. The method of claim 5, wherein adjusting the handoff parameter comprises increasing the handoff search window.

7. The method of claim 1, wherein configuring the cellular base station with one or more operational parameters comprises setting the handoff parameter, wherein the handoff parameter comprises a signal strength threshold that is used as a condition for making a handoff decision.

8. The method of claim 1, wherein configuring the cellular base station with one or more operational parameters comprises setting the handoff parameter, wherein the handoff parameter comprises a data rate threshold that is used as a condition for making a handoff decision.

9. The method of claim 1, wherein configuring the cellular base station with one or more operational parameters comprises setting the handoff parameter, wherein the handoff parameter comprises a load threshold that is used as a condition for making a handoff decision.

10. The method of claim 1, wherein configuring the cellular base station with one or more operational parameters comprises increasing the transmit power.

11. The method of claim 1, wherein configuring the cellular base station with one or more operational parameters comprises decreasing the transmit power.

12. The method of claim 1, wherein configuring the cellular base station with one or more operational parameters comprises activating the whitelist, wherein the whitelist comprises a list of one or more wireless communication devices (WCDs) authorized to receive wireless services from the cellular base station.

13. A computing device comprising:
a processor;
data storage; and
program instructions, stored in the data storage that, upon execution by the processor, cause the computing device to:
determine an altitude of a cellular base station;
compare the determined altitude to a threshold altitude to determine whether or not the determined altitude exceeds the threshold altitude; and
responsive to a determination that the determined altitude exceeds the threshold altitude, configure the cellular base station with one or more operational parameters based on the determined altitude, wherein the one or more operational parameters includes at least one parameter selected from the group consisting of a transmit power, a carrier frequency, a handoff parameter, and a whitelist.

14. The computing device of claim 13, wherein the cellular base station is a femtocell.

15. The computing device of claim 13, wherein determining the altitude of the cellular base station comprises receiving an indication of the altitude from one or more components of the cellular base station.

16. The computing device of claim 13, wherein determining the altitude of the cellular base station comprises:
determining a network address of the cellular base station; and
determining the altitude of the cellular base station based on the determined network address.

17. A non-transitory computer-readable medium having stored thereon program instructions that, upon execution by a processor, cause a computing device to perform functions comprising:
determining an altitude of the cellular base station;
comparing the determined altitude to a threshold altitude to determine whether or not the determined altitude exceeds the threshold altitude; and
responsive to a determination that the determined altitude exceeds the threshold altitude, configuring the cellular base station with one or more operational parameters based on the determined altitude, wherein the one or more operational parameters includes at least one parameter selected from the group consisting of a transmit power, a carrier frequency, a handoff parameter, and a whitelist.

18. The non-transitory computer-readable medium of claim 17, wherein the cellular base station is a femtocell.

19. The non-transitory computer-readable medium of claim 17, wherein determining the altitude of the cellular base station comprises receiving an indication of the altitude from one or more components of the cellular base station.

20. The non-transitory computer-readable medium of claim 17, wherein determining the altitude of the cellular base station comprises:
determining a network address of the cellular base station; and
determining the altitude of the cellular base station based on the determined network address.

* * * * *